United States Patent
Redfern

(10) Patent No.: US 7,352,820 B2
(45) Date of Patent: Apr. 1, 2008

(54) DMT SYSTEM WITH VARIABLE SUBCHANNEL SPACING IN TCM ISDN NOISE

(75) Inventor: Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 566 days.

(21) Appl. No.: 11/078,777

(22) Filed: Mar. 11, 2005

(65) Prior Publication Data

US 2005/0207482 A1 Sep. 22, 2005

Related U.S. Application Data

(60) Provisional application No. 60/553,903, filed on Mar. 16, 2004.

(51) Int. Cl.
*H04L 27/28* (2006.01)
(52) U.S. Cl. ..................................... 375/260
(58) Field of Classification Search ............... 375/260, 375/142, 145, 149, 295, 316, 330, 342, 343, 375/355, 362, 364, 367; 370/320, 324, 330, 370/350, 481, 482, 503, 509, 513, 515
See application file for complete search history.

(56) References Cited

U.S. PATENT DOCUMENTS

| | | | |
|---|---|---|---|
| 6,266,347 B1 | 7/2001 | Amrany et al. | |
| 6,487,252 B1 | 11/2002 | Kleider et al. | |
| 6,510,184 B1 | 1/2003 | Okamura | |
| 7,113,549 B1* | 9/2006 | Isaksson et al. | 375/285 |
| 2003/0123383 A1* | 7/2003 | Korobkov et al. | 370/208 |
| 2003/0128835 A1 | 7/2003 | Lee | |

OTHER PUBLICATIONS

Evans, Brian L., Introduction to ADSL Modems, Embedded Signal Processing Laboratory, The University of Texas at Austin, website.

* cited by examiner

*Primary Examiner*—Sam K. Ahn
(74) *Attorney, Agent, or Firm*—Steven A. Shaw; W. James Brady; Frederick J. Telecky, Jr.

(57) ABSTRACT

A device comprises a first component operable to produce a plurality of discrete multitone symbols based in part on a subchannel spacing and a cyclic extension length and a second component operable to determine the subchannel spacing and the cyclic extension length, the cyclic extension length selected based on the subchannel spacing to increase the number of discrete multitone symbols transmitted during a low noise interval of a cyclostationary noise environment.

20 Claims, 2 Drawing Sheets

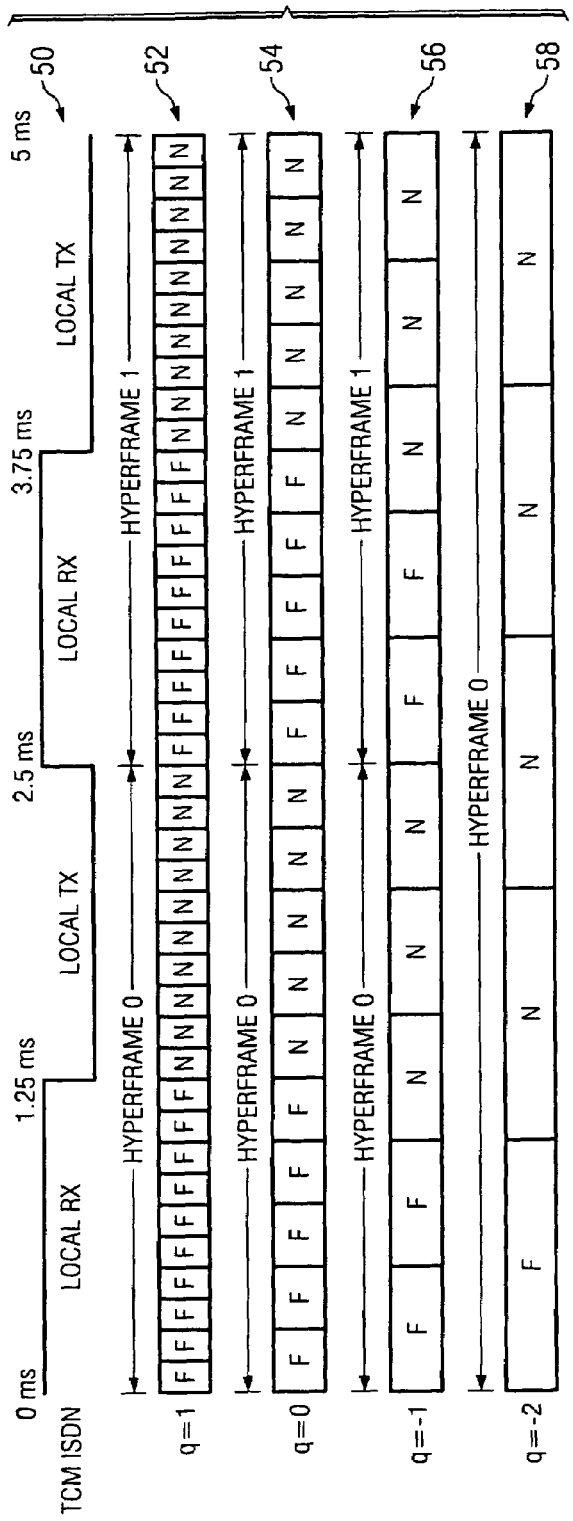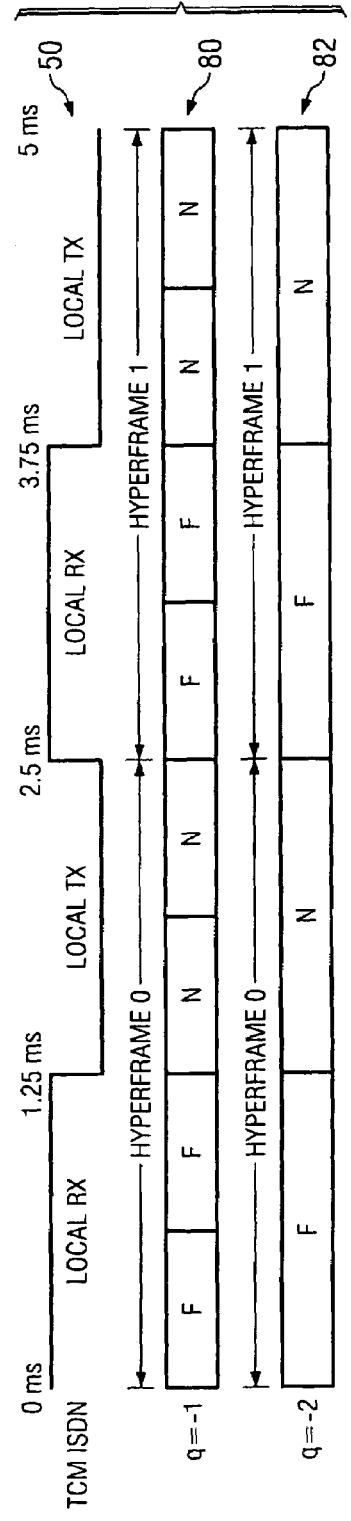
FIG. 2
FIG. 3

DMT SYSTEM WITH VARIABLE SUBCHANNEL SPACING IN TCM ISDN NOISE

CROSS-REFERENCE TO RELATED APPLICATIONS

This application claims priority to U.S. Provisional Application No. 60/553,903 filed Mar. 16, 2004, and entitled "DMT System with Variable Subchannel Spacing in TCM ISDN Noise," by Arthur J. Redfern, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communications systems, and more particularly, but not by way of limitation, to a DMT system with variable subchannel spacing in TCM ISDN noise.

BACKGROUND OF THE INVENTION

Data communication devices may use various data transmission rates, data encoding formats, and modulation techniques. Two transceivers may cooperate to determine the quality of the communication channel they use to communicate with each other, for example using an initialization sequence or process before engaging in substantive communication. The two transceivers may also share information to make a collective decision to select operational parameters controlling their communication, for example data transmission rates and data encoding techniques.

In general, data communication may take place in accordance with communication standards or protocols which promote interoperability of equipment produced by different manufacturers. As the electronics art advances, the ability to increase data throughput leads to new communication standards and/or protocols supporting higher data transmission rates.

SUMMARY OF THE INVENTION

A device is disclosed. The device comprises a first component operable to produce a plurality of discrete multitone symbols based in part on a subchannel spacing and a cyclic extension length and a second component operable to determine the subchannel spacing and the cyclic extension length, the cyclic extension length selected based on the subchannel spacing to increase the number of discrete multitone symbols transmitted by the transmitter during a low noise interval of a cyclostationary noise environment.

A method of communicating in a cyclostationary noise environment is also disclosed. The method comprises transmitting one or more first discrete multitone symbols during a high noise interval and transmitting one or more second discrete multitone symbols during a low noise interval, the first and second discrete multitone symbols having a cyclic extension length selected based on a subchannel spacing to increase the number of second discrete multitone symbols transmitted.

A digital subscriber line communication system is also disclosed. The digital subscriber line communication system comprises a first transceiver and a second transceiver, the second transceiver operable to transmit a plurality of discrete multitone symbols to the first transceiver, the discrete multitone symbols based in part on a subchannel spacing and a cyclic extension length, the cyclic extension length selected based on the subchannel spacing to increase the number of discrete multitone symbols transmitted during an interval of low noise at the first transceiver in a cyclostationary noise environment.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 2 is a signal diagram of a TCM ISDN TDD signal juxtaposed with four DSL hyperframe architectures with a cyclic extension length based on a parameter m value of 20 according to an embodiment of the present disclosure.

FIG. 3 is a signal diagram of the TCM ISDN TDD signal juxtaposed with two DSL hyperframe architectures with the cyclic extension length based on the parameter m value of 89 according to an embodiment of the present disclosure.

DETAILED DESCRIPTION OF THE PREFERRED EMBODIMENTS

Figure 1:
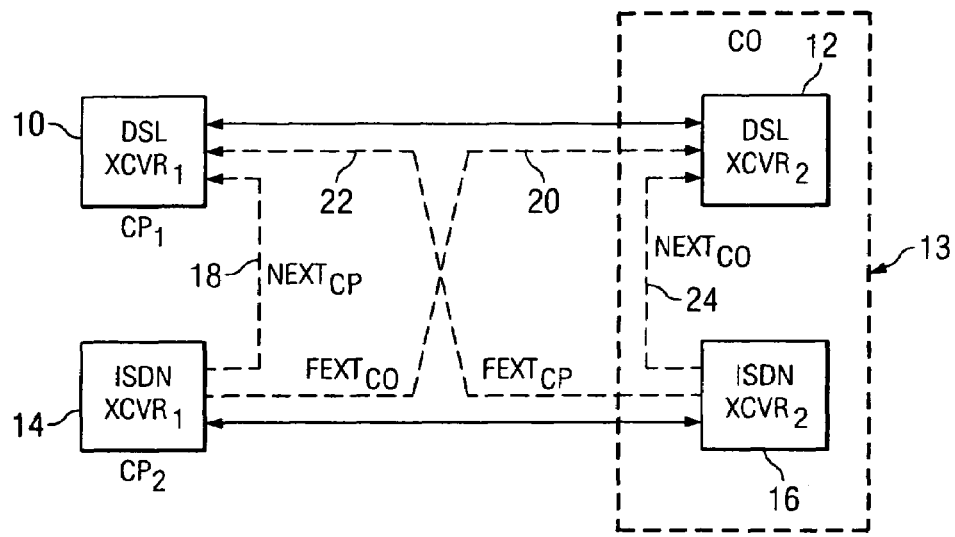
FIG. 1 depicts two DSL transceivers communicating in the presence of TCM ISDN TDD cyclostationary noise according to an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

In the Japanese telecommunications network, time compression multiplex (TCM) integrated systems digital network (ISDN) communication may be carried out between a first ISDN transceiver located in a customer premises (CP) and a second ISDN transceiver located in a central office (CO) in a ping-pong fashion. The first ISDN transceiver transmits while the second ISDN transceiver listens for 1.25 mS and then the second ISDN transceiver transmits while the first ISDN transceiver listens for 1.25 mS. This back and forth communication scheme may be referred to as time division duplex (TDD). A first digital subscriber line (DSL) transceiver located in a customer premises communicating with a second DSL transceiver substantially co-located in the CO with the second ISDN transceiver experiences a 1.25 mS interval of elevated noise due to near end crosstalk (NEXT) when the first ISDN transceiver transmits followed by a 1.25 mS interval of diminished noise due to far end crosstalk (FEXT) when the second ISDN transceiver transmits. The second DSL transceiver experiences a 1.25 mS interval of elevated noise due to NEXT when the second ISDN transceiver transmits followed by a 1.25 mS interval of diminished noise due to FEXT when the first ISDN transceiver transmits. Note that when the first DSL transceiver is experiencing NEXT, the second DSL transceiver is experiencing FEXT and that when the first DSL transceiver is experiencing FEXT, the second DSL transceiver is experiencing NEXT.

The alternating periods of NEXT and FEXT may be termed a cyclostationary noise environment. Cyclostationary noise, generally, may designate a noise pattern that has statistical properties that vary periodically with time. In the case of TCM ISDN TDD cyclostationary noise, the period comprises two sub-periods, each sub-period having a stationary noise character. The present disclosure describes a novel DSL communication system that may increase data throughput by maximizing the number of discrete multitone (DMT) symbols that are transmitted to a DSL transceiver while the DSL transceiver is experiencing FEXT, when the DSL transceiver is able to receive DMT symbols encoded with higher order constellations. The novel DSL communication system described adjusts the length of the cyclic prefix of the DMT symbol to maximize the number of DMT symbols that are transmitted to the DSL transceiver when the DSL transceiver is experiencing FEXT. While the preferred embodiment is directed to a TCM ISDN TDD cyclostationary noise environment, such as that known in Japan, one skilled in the art will appreciate that the disclosure may apply to other cyclostationary noise environments.

Turning now to FIG. 1, a block diagram depicts a first DSL transceiver 10 communicating with a second DSL transceiver 12 in the presence of cyclostationary noise. The first DSL transceiver 10 may be located in a first customer premises (CP), for example the home of a first subscriber, and the second DSL transceiver 12 may be located in a central office (CO) 13, such as of a telecommunications provider. In an embodiment, a first ISDN transceiver 14 communicating with a second ISDN transceiver 16 using a TCM ISDN TDD communication protocol may cause the cyclostationary noise. The first ISDN transceiver 14 may be located in a second customer premises, for example the home of a second subscriber, and the second ISDN transceiver 16 may be located in the CO 13. In other embodiments, the cyclostationary noise may be caused by other sources.

When the first ISDN transceiver 14 transmits, a $NEXT_{cp}$ 18 is received by the first DSL transceiver 10, and a $FEXT_{co}$ 20 is received by the second DSL transceiver 12. When the second ISDN transceiver 16 transmits, a $FEXT_{cp}$ 22 is received by the first DSL transceiver 10, and a $NEXT_{co}$ 24 is received by the second DSL transceiver 12. Because a plurality of ISDN transceivers located in the CO 13, for example including the second ISDN transceiver 16 and other ISDN transceivers, may transmit concurrently and because the ISDN transceivers located in the CO 13 may be in close proximity to each other, the magnitude of the $NEXT_{co}$ 24 experienced at the second DSL transceiver 12 may be substantially greater than the magnitude of the $NEXT_{cp}$ 18 experienced at the first DSL transceiver 10.

In an embodiment, the first and second DSL transceivers 10, 12 communicate using discrete multitone (DMT) encoding, for example using an asynchronous digital subscriber line (ADSL) or a very-high-data-rate digital subscriber line (VDSL) version 2 communication protocol. In DMT encoding, a transmitter, for example the first DSL transceiver 10 acting as a transmitter, may encode a varying number of bits of data into each of a plurality of subchannels that comprise a DMT symbol, transform the DMT symbol from the frequency domain to the time domain using an inverse fast Fourier transform, convert the time domain digital signal to an analog signal, and transmit the analog signal to a receiver, for example the second DSL transceiver 12 acting as a receiver. In addition to subchannels encoding data, the DMT symbol may include a cyclic prefix that duplicates some of the subchannels to provide redundancy that aids reception of the DMT symbol in a noisy environment or when transmitting over a "long channel," where long channel refers to the transmission path having a long time domain impulse response.

The transmitter can increase the number of bits encoded in each subchannel of the DMT symbol when low noise is present at the receiver. The transmitter may decrease the number of bits encoded in each subchannel of the DMT symbol when high noise is present at the receiver to enable the receiver to decode the subchannels. Different subchannels within the DMT symbol may be encoded with different numbers of bits, for example when a first subchannel is associated with a higher level of noise at the receiver than the noise associated with a second subchannel, as for example when a narrowband interferer is present in the frequency bandwidth associated with the first subchannel, or because the first subchannel is located at a higher frequency than the second subchannel and the signal-to-noise (SNR) margin in the channel decreases with higher frequency.

Quadrature amplitude modulation (QAM) may be employed to encode bits for subchannels of a DMT symbol. QAM values include an amplitude or real component and an angle or imaginary component. QAM values are discretized and may only take on a limited range of allowed values. The number of QAM values allowed is related to the number of bits which may be encoded using a single QAM value. A small number of allowed QAM values is associated with a small number of bits encoded in a single QAM value; a large number of allowed QAM values is associated with a large number of bits encoded in a single QAM value. The group of allowed QAM values may be referred to as a constellation. A constellation that encodes a large number of bits may be called a high order constellation or a large constellation while a constellation that encodes a small number of bits may be called a low order constellation or a small constellation.

The number of bits to be encoded in each of the subchannels of the DMT symbol, for example the QAM constellation size, may be stored in a bit table or other data structure. The bit table associated with transmissions to the first DSL transceiver 10 may be determined by the first DSL transceiver 10 and communicated to the second DSL transceiver 12 during initialization procedures. The bit table associated with transmissions to the second DSL transceiver 12 may be determined by the second DSL transceiver 12 and communicated to the first DSL transceiver 10 during initialization procedures. In an embodiment, the bit table may be combined with subchannel gain information in a bits and gains table.

In an embodiment, the first DSL transceiver 10 determines a first NEXT bit table that defines the number of bits encoded in the subchannels of the DMT symbols that the first DSL transceiver 10 receives while receiving the NEXT$_{cp}$ 18 and a first FEXT bit table that defines the number of bits encoded in the subchannels of the DMT symbols that the first DSL transceiver 10 receives while receiving the FEXT$_{cp}$ 22. The first NEXT bit table and the first FEXT bit table may be referred to as subchannel bit encoding maps. The first DSL transceiver 10 may determine the first NEXT bit table and the first FEXT bit table based on initialization procedures, for example based on a training period where known signals are exchanged between the first DSL transceiver 10 and the second DSL transceiver 12. The first DSL transceiver 10 may communicate the first NEXT bit table and the first FEXT bit table to the second DSL transceiver 12 during initialization procedures.

A FEXT automatic gain control (AGC) and a NEXT AGC may similarly be determined by each of the first and second DSL transceivers 10, 12 during initialization training periods. The FEXT AGC would be determined during FEXT intervals, and the NEXT AGC would be determined during NEXT intervals. Each DSL transceiver 10, 12 may then employ two different AGC settings. If only one AGC setting is used, the AGC associated with less gain should be employed to avoid saturation during reception of the strongest signal. A FEXT power spectrum density (PSD) and a NEXT PSD may similarly be determined by each of the fist and second DSL transceivers 10, 12 during initialization training periods and communicated to the peer DSL transceiver 10, 12. During initialization, there may be an opportunity to separately set the PSD used during FEXT and NEXT intervals. This may be useful in a case where the transmit power constraint is such that the transmit PSD cannot fully fill in the allowed PSD template or mask. For this case, improved performance may be realized if the noise on the FEXT and NEXT intervals differs significantly and advantage may be obtained by putting power in different parts of the allowed frequency band. DSL initialization procedures are discussed further in U.S. patent application Ser. No. 11/055,377, entitled "A Flexible Initialization Method for DSL Communication Systems," filed Feb. 10, 2005, by Arthur Redfern, which is incorporated herein by reference for all purposes.

The first DSL transceiver 10 may also revise the first NEXT bit table and the first FEXT bit table based on changes in the cyclostationary noise environment over time and communicate the revised first NEXT bit table and the revised first FEXT bit table to the second DSL transceiver 12 after completion of initialization procedures. The second DSL transceiver 12 similarly determines and communicates to the first DSL transceiver 10 a second NEXT bit table that defines the number of bits encoded in the subchannels of the DMT symbols that the second DSL transceiver 12 receives while receiving the NEXT$_{co}$ 24 and a second FEXT bit table that defines the number of bits encoded in the subchannels of the DMT symbols that the second DSL transceiver 12 receives while receiving the FEXT$_{co}$ 20. The second NEXT bit table and the second FEXT bit table may be referred to as subchannel bit encoding maps. In an embodiment, the first and second transceivers 10, 12 may selectably operate in a dual bit mode where NEXT and FEXT bit tables are employed to encode the subchannels or in a single bit mode where only NEXT bit tables or only FEXT bit tables are employed.

In a DMT communication system employing a large number of subchannels and wide bandwidth, cyclostationary noise may affect only a small portion of the available subchannels. To save memory, in an embodiment, the first and second NEXT bit tables may only store information on subchannels where the bit encoding differs from the bit encoding identified in the corresponding first or second FEXT bit table. The information stored in each entry of such a differential NEXT bit table may include an index to the subject subchannel and the bit count for that subchannel.

In an embodiment, the cyclostationary noise has a period of substantially 2.5 mS. For substantially half of this period, 1.25 mS, the NEXT$_{cp}$ 18 is strong at the first DSL transceiver 10 and for the remaining portion of this period, 1.25 mS, the FEXT$_{cp}$ 22 is strong at the first DSL transceiver 10. The first and second DSL transceivers 10, 12 may vary the length of the DMT symbols, for example to better accommodate longer or shorter loop lengths, or distances between the first DSL transceiver 10 and the second DSL transceiver 12. In an embodiment, the length of the DMT symbol may be calculated as:

$$Length_{DMT} = \frac{2^{n+1+8} + m \times 2^{n+1}}{4312.5 \times 2^{n+1+8} 2^q} = \frac{2^8 + m}{4312.5 \times 2^8 2^q} = \frac{256 + m}{1104000 \times 2^q} \quad (1)$$

where the number of subchannels $N_{sc}=2^{n+8}$, the length of the cyclic extension $L_{ce}=m \times 2^{n+1}$, and the subchannel spacing $f=4312.5 \times 2^q$ Hz. The length of the DMT symbol varies inversely proportional to the subchannel spacing. By decreasing the subchannel spacing, the length of the DMT symbol is increased and the length of a cyclic prefix component of the DMT symbol is also increased. Because transmission of DMT symbols in a long channel, i.e., a communication channel having a time domain impulse response which is long in time duration, is more readily decoded when the DMT symbol includes a longer cyclic prefix, in some embodiments narrower subchannel spacing and longer DMT symbol lengths may be preferred.

Turning now to FIG. 2, a signal diagram depicts a first TCM ISDN TDD communication session 50 and several DSL communication sessions during which the first DSL transceiver 10 receives: a first DSL communication session 52, a second DSL communication session 54, a third DSL communication session 56, and a fourth DSL communication session 58. During the intervals 0 mS to 1.25 mS and 2.5 mS to 3.75 mS of the first TCM ISDN TDD communication session 50, which may be referred to as FEXT intervals with respect to the first DSL transmitter 10, the second ISDN transceiver 16 transmits to the first ISDN transceiver 14, and the first DSL transceiver 10 receives the FEXT$_{cp}$ 22. During the intervals 1.25 mS to 2.5 mS and 3.75 mS to 5 mS of the first TCM ISDN TDD communication session 50, which may be referred to as NEXT intervals with respect to the first DSL transmitter 10, the first ISDN transceiver 14 transmits to the second ISDN transceiver 16, and the first DSL transceiver 10 receives the NEXT$_{cp}$ 18.

The DSL communication sessions, 52, 54, 56, and 58 each have a cyclic prefix based on m=20. The first DSL communication session 52 has a subchannel spacing of 8625 Hz based on q=(1). The second DSL communication session 54 has a subchannel spacing of 4312.5 Hz based on q=(0). The third DSL communication session 56 has a subchannel spacing of 2156.25 Hz based on q=(−1). The fourth DSL communication session 58 has a subchannel spacing of 1078.125 Hz based on q=(−2).

In the first DSL communication session 52, during the FEXT intervals, the second DSL transceiver 12 transmits and the first DSL transceiver 10 may receive 10 DMT symbols encoded according to the first FEXT bit table, and during the NEXT intervals, the second DSL transceiver 12 transmits and the first DSL transceiver 10 may receive 10 DMT symbols encoded according to the first NEXT bit table. In the second DSL communication session 54, during the FEXT intervals, the second DSL transceiver 12 transmits and the first DSL transceiver 10 may receive 5 DMT symbols encoded according to the first FEXT bit table, and during the NEXT intervals, the second DSL transceiver 12 transmits and the first DSL transceiver 10 may receive 5 DMT symbols encoded according to the first NEXT bit table. In the third DSL communication session 56, during the FEXT intervals, the second DSL transceiver 12 transmits and the first DSL transceiver 10 may receive 2 DMT symbols encoded according to the first FEXT bit table, and during the NEXT intervals, the second DSL transceiver 12 transmits and the first DSL transceiver 10 may receive 3 DMT symbols encoded according to the first NEXT bit table. In the fourth DSL communication session 58, during the first FEXT interval, the second DSL transceiver 12 transmits and the first DSL transceiver 10 may receive 1 DMT symbol encoded according to the first FEXT bit table, and during the NEXT intervals, the second DSL transceiver 12 transmits and the first DSL transceiver 10 may receive 5 DMT symbols encoded according to the first NEXT bit table. A similar analysis may be applied to communications from the first DSL transceiver 10 to the second DSL transceiver 12 using a cyclic extension length based on m=20, where the FEXT and NEXT intervals are swapped and the second FEXT and second NEXT bit tables are employed by the first DSL transceiver 10 to encode subchannels and by the second DSL transceiver 12 to decode subchannels.

Note that because of the length of the DMT symbol in the fourth DSL communication session 58, the third DMT symbol straddles or splits the first and second TCM ISDN TDD period and may desirably be transmitted in accordance with the first NEXT bit table to avoid poor decoding resulting from influence of the $NEXT_{cp}$ 18. Each DSL communication session 52, 54, 56, and 58 has an associated hyperframe defined that is the maximum of the period of the TCM ISDN TDD communication session 50 and the period of the pattern of DMT symbols encoded according to the first FEXT bit table and DMT symbols encoded according to the first NEXT bit table. The DSL communication sessions 52, 54, 56, and 58 are synchronized to the TCM ISDN TDD communication session 50 as shown. In an embodiment, the second DSL transceiver 12 may be synchronized to the TCM ISDN TDD communication session 50 through communication with the second ISDN transceiver 16. During the initialization training period, the second DSL transceiver 12 may send a known signal in at least some of the subchannels of the first symbol of every hyperframe to the first DSL transceiver 10, providing a means for the first DSL transceiver 10 to synchronize to the TCM ISDN TDD communication session 50. For example, the bits 11 may be transmitted on the even numbered subchannels and on subchannels 9, 19, 29, and so forth and the bits 00 may be transmitted on the other odd numbered subchannels in the first DMT symbol of every hyperframe. During another portion of the initialization training period, the bits 11 may be transmitted on subchannels 5, 10, 15, and subchannels that are other multiples of 5 and the bits 00 transmitted on the remaining subchannels.

Turning now to FIG. 3, a signal diagram depicts the first TCM ISDN TDD communication session 50 and two DSL communication sessions during which the first DSL transceiver 10 receives: a fifth DSL communication session 80 and a sixth DSL communication session 82. The fifth and sixth DSL communication sessions 80, 82 each have a cyclic prefix length based on m=89. The fifth DSL communication session 80 has a subchannel spacing of 2156.25 based on q=(−1), and the sixth DSL communication session 82 has a subchannel spacing of 1078.125 Hz based on q=(−2).

In the fifth DSL communication session 80, during the FEXT intervals, the second DSL transceiver 12 transmits and the first DSL transceiver 10 may receive 2 DMT symbols encoded according to the first FEXT bit table, and during the NEXT intervals, the second DSL transceiver 12 transmits and the first DSL transceiver 10 may receive 2 DMT symbols encoded according to the first NEXT bit table. While the fifth DSL communication session 80 has the same number of DMT symbols encoded according to the first FEXT bit table and one less DMT symbol encoded according to the first NEXT bit table relative to the third DSL communication session 56, the longer cyclic prefix of the fifth DSL communication session 80 may be an advantage where a long channel warrants a longer cyclic prefix. A similar analysis may be applied to communications from the first DSL transceiver 10 to the second DSL transceiver 12 using a cyclic extension length based on m=89, where the FEXT and NEXT intervals are swapped and the second FEXT and second NEXT bit tables are employed by the first DSL transceiver 10 to encode subchannels and by the second DSL transceiver 12 to decode subchannels.

Each DSL communication session 80, 82 has an associated hyperframe defined that is the maximum of the period of the TCM ISDN TDD communication session 50 and the period of the pattern of DMT symbols encoded according to the first FEXT bit table and DMT symbols encoded according to the first NEXT bit table.

In the sixth DSL communication session 82, during the FEXT intervals, the second DSL transceiver 12 transmits and the first DSL transceiver 10 may receive 1 DMT symbol encoded according to the first FEXT bit table, and during the NEXT intervals, the second DSL transceiver 12 transmits and the first DSL transceiver 10 may receive 1 DMT symbol encoded according to the first NEXT bit table. Over two periods of the cyclostationary noise associated with the first TCM ISDN TDD session 50, the sixth DSL communication session 82 has two fewer DMT symbols encoded according to the first NEXT bit table and one additional DMT symbol encoded according to the first FEXT bit table relative to the fourth DSL communication session 58. In some cyclostationary noise environments, the reduction of data throughput represented by dropping two DMT symbols encoded according to the first NEXT bit table may be more than compensated for by the increased throughput represented by adding one DMT symbol encoded according to the first FEXT bit table. Additionally, the longer cyclic prefix of the sixth DSL communication session 82 may be an advantage where a long channel warrants a longer cyclic prefix. Thus, by adjusting the length of the cyclic extension in combination with the subchannel spacing, different cyclostationary noise environments and different loop lengths may be accommodated to maximize data throughput rates. Generally, it is desirable to employ a DSL hyperframe architecture having a minimum amount of unnecessary redundancy, with reference to a cyclic prefix length, and having a maximum number of DMT symbols encoded according to the first and second FEXT bit tables. While an example has been presented based on TCM ISDN TDD cyclostationary noise, one skilled in the art readily appreciates that the above described technique of adjusting the length of the cyclic extension in combination with subchannel spacing may be applied to other cyclostationary noise environments.

In an embodiment, the first DSL transceiver 10 and the second DSL transceiver 12 may communicate with each other in a low power mode by transmitting multiple scaled and rotated versions of a basis DMT symbol. While a receiver may not be able to decode any single low power DMT symbol because it is received with an insufficient SNR, it may be possible to process stationary noise out of the multiple scaled and rotated versions of the basis DMT symbol, thereby increasing the SNR to a point where the basis DMT symbol may be inferred and thus decoded. The first DSL transceiver 10 and the second DSL transceiver 12 may employ a low power communication mode to maintain a communication link in the absence of actual active upper layer communications, for example transmitting meaningless sequences of bits. Alternatively, the first DSL transceiver 10 and the second DSL transceiver 12 may employ a low power communication mode when carrying a low bit rate content, such as a voice call.

Figure 4:
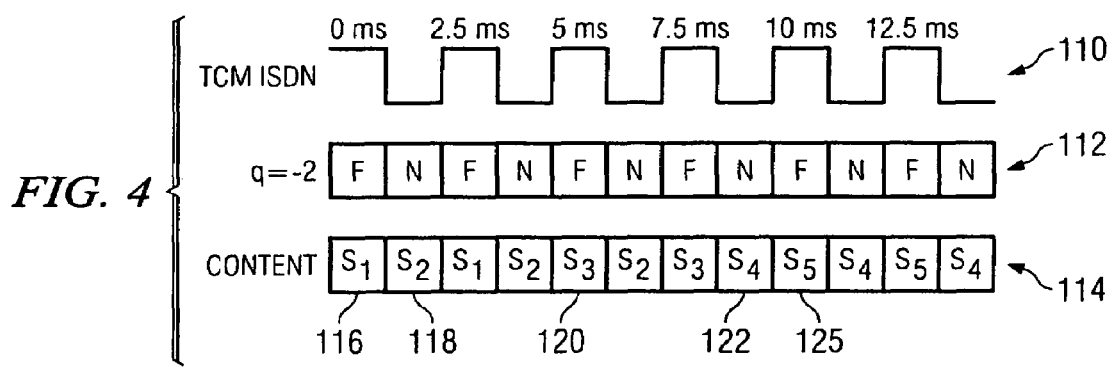
FIG. 4 is a signal diagram of the TCM ISDN TDD signal juxtaposed with a DSL hyperframe architecture with the cyclic extension length based on the parameter m value of 89 and a low power content loading according to an embodiment of the present disclosure.

Turning now to FIG. 4, a signal diagram depicts a second TCM ISDN TDD communication session 110 and a seventh DSL communication session 112. The second TCM ISDN TDD communication session 110 is substantially similar to the first TCM ISDN TDD communication session 50, with the exception that six periods of the TCM ISDN TDD communication session are depicted. The seventh DSL communication session 112 is substantially similar to the sixth DSL communication session 82, with the exception that six hyperframes are depicted. During the seventh DSL communication session 112, the second DSL transceiver 12 transmits to the first DSL transceiver 10 using low power. The second DSL transceiver 12 transmits a content 114 comprised of a plurality of scaled and rotated versions of a first DMT symbol $S_1$ 116, a second DMT symbol $S_2$ 118, a third DMT symbol $S_3$ 120, a fourth DMT symbol $S_4$ 122, and a fifth DMT symbol $S_5$ 124. To enable decoding of the DMT symbols, the DMT symbols 116, 118, 120, 122, and 124 may be repeated. Because the SNR available during FEXT intervals is different from the SNR available during NEXT intervals, each DMT symbol 116, 118, 120, 122, and 124 is repeated only within all FEXT intervals or within all NEXT intervals. Additionally, the number of times that DMT symbols 116, 118, 120, 122, and 124 are retransmitted may be different as a result of being transmitted during FEXT intervals and being transmitted during NEXT intervals. For example, the DMT symbol $S_1$ 116 is transmitted twice on FEXT intervals while the DMT symbol $S_2$ 118 is transmitted three times on NEXT intervals. The frequency of transmission depicted here is only exemplary. In other embodiments, in different cyclostationary noise environments, different numbers of repetitions may be employed.

Figure 5:
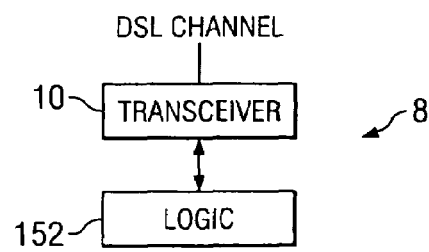
FIG. 5 is a block diagram of a transceiver coupled to a logic component according to an embodiment of the present disclosure.

Turning now to FIG. 5, a device 8 is shown that includes the first DSL transceiver 10, which may be referred to as a first component, that is coupled to a logic component 152, which may be referred to as a second component. In an embodiment, the logic component 152 analyzes the signals that the first DSL transceiver 10 receives and determines the appropriate subchannel spacing or q value and the appropriate cyclic prefix length or m value to be used to transmit to the first DSL transceiver 10, for example from the second DSL transceiver 12 to the first DSL transceiver 10. The logic component 152 selects the appropriate cyclic prefix length or m value based on the subchannel spacing so as to maximize the number of DMT symbols received during FEXT intervals, as described above with reference to FIGS. 2 and 3. In another embodiment, the logic component 152 may be contained within the first DSL transceiver 10.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A device, comprising:
   a first component operable to produce a plurality of discrete multitone symbols based in part on a subchannel spacing and a cyclic extension length; and
   a second component operable to determine the subchannel spacing and the cyclic extension length, the cyclic extension length selected based on the subchannel spacing to increase the number of discrete multitone symbols transmitted during a low noise interval of a cyclostationary noise environment.

2. The device of claim 1, wherein the device communicates in accordance with a very-high-data-rate digital subscriber line version 2 protocol and the cyclostationary noise environment is produced at least in part by transmissions of one or more time compression multiplex integrated services digital network time division duplex transceivers.

3. The device of claim 1, wherein the first component produces the discrete multitone symbols based on a first bit mode associated with a higher throughput during the low noise interval of the cyclostationary noise environment and based on a second bit mode associated with a lower throughput during a high noise interval of the cyclostationary noise environment.

4. The device of claim 3, wherein a first bit table indicates the number of bits to be encoded in each of a plurality of subchannels of the discrete multitone symbol in the first bit mode and a second bit table indicates the number of bits to be encoded in the subchannels of the discrete multitone symbol that have a different number of bits in the second bit mode versus the number of bits in the first bit table.

5. The device of claim 3, wherein the cyclostationary noise environment is characterized by a repeating noise pattern composed of two intervals, a first interval of elevated far end cross talk noise combined with diminished near end cross talk noise followed by a second interval of diminished far end cross talk noise combined with elevated near end cross talk noise at a receiver of the discrete multitone symbols transmitted by the transceiver.

6. The device of claim 5, wherein the repeating noise pattern has a period of substantially 2.5 milliseconds and the first interval and the second interval are substantially equal in time duration.

7. The device of claim 6, wherein the length of the discrete multitone symbol is related to the subchannel spacing and the cyclic extension length by the equation:

$$\text{discrete multitone symbol length} = \frac{2^{n+1+8} + m \times 2^{n+1}}{4312.5 \times 2^{n+1+8} 2^q}$$

where the cyclic extension length is $m \times 2^{n+1}$, the subchannel spacing is $4312.5 \times 2^q$ Hz, and the number of subchannels is $2^{n+8}$.

8. The device of claim 7, where the cyclic extension length and the subchannel spacing are selected from the group of (q,m) pairs consisting of (1, 20), (−1, 20), (−2, 20), (−1, 89), and (−2, 89).

9. The device of claim 5, wherein the device in a low power mode transmits a first discrete multitone symbol multiple times during one or more of the first intervals of elevated far end cross talk noise and transmits a second discrete multitone symbol multiple times during one or more of the second intervals of diminished far end cross talk noise.

10. The device of claim 5, wherein the device trains a first automatic gain control value during one or more of the first intervals of elevated far end cross talk noise, trains a second automatic gain control value during one or more of the second intervals of diminished far end cross talk, and selects for use one of the first and second automatic gain control values.

11. The device of claim 5, wherein the first component determines a first power spectrum density during one or more of the first intervals of elevated far end cross talk noise and determines a second power spectrum density during one or more of the second intervals of diminished far end cross talk noise, and the device transmits according to the first power spectrum density during the first intervals of elevated far end cross talk noise and according to the second power spectrum density during the second intervals of diminished far end cross talk noise.

12. A method of communicating in a cyclostationary noise environment, comprising:
transmitting one or more first discrete multitone symbols during a high noise interval;
transmitting one or more second discrete multitone symbols during a low noise interval, the first and second discrete multitone symbols having a cyclic extension length selected based on a subchannel spacing to increase the number of second discrete multitone symbols transmitted.

13. The method of claim 12, wherein the first discrete multitone symbols are encoded based on a first subchannels bit count and the second discrete multitone symbols are encoded based on a second subchannels bit count.

14. The method of claim 13, further including:
transmitting in a low power mode a plurality of scaled and rotated versions of a third discrete multitone symbol in the first discrete multitone symbols;
decoding the third discrete multitone symbol from the first discrete multitone symbols based on the first subchannels bit count
transmitting in a low power mode a plurality of scaled and rotated versions of a fourth discrete multitone symbol in the second discrete multitone symbols; and
decoding the fourth discrete multitone symbol from the second discrete multitone symbols based on the second subchannels bit count.

15. The method of 12, further including:
selecting an encoding mode, the encoding mode having a single subchannels bit count mode according to which the first discrete multitone symbols and the second discrete multitone symbols are encoded based on a first subchannels bit count and a dual subchannels bit count mode according to which the first discrete multitone symbols are encoded based on the first subchannels bit count and the second discrete multitone symbols are encoded based on a second subchannels bit count.

16. The method of 12, wherein a period of the cyclostationary noise environment and the discrete multitone encoding is a hyperframe and the method further includes:
transmitting by a first transceiver a known bit pattern on at least some of the subchannels of the initial discrete multitone symbol of a hyperframe;
receiving by a second transceiver the initial discrete multitone symbol of a hyperframe; and
determining by the second transceiver, based on the known bit pattern contained in the at least some of the subchannels of the initial discrete multitone symbol of the hyperframe, the hyperframe alignment known to the first transceiver.

17. A digital subscriber line communication system, comprising:
a first transceiver; and
a second transceiver operable to transmit a plurality of discrete multitone symbols to the first transceiver, the discrete multitone symbols based in part on a subchannel spacing and a cyclic extension length, the cyclic extension length selected based on the subchannel spacing to increase the number of discrete multitone symbols transmitted during an interval of low noise at the first transceiver in a cyclostationary noise environment.

18. The digital subscriber line communication system of claim 17, wherein the first transceiver is located in a central office, and the cyclostationary noise environment is generated at least in part by time compression multiplex integrated digital services network time division duplex communications in which the central office engages.

19. The digital subscriber line communication system of claim 17, wherein the cyclostationary noise environment is characterized by a repeating noise pattern composed of two intervals, the low noise interval and a high noise interval, the second transceiver transmits one discrete multitone symbol using a first subchannel bit encoding map during each interval of low noise at the first transceiver, and transmits one discrete multitone symbol using a second subchannel bit encoding map during each interval of high noise at the first transceiver, the first subchannel bit encoding map employing higher order constellations for encoding at least some of the subchannels.

20. The digital subscribe line communication system of claim 17, wherein the cyclostationary noise environment is characterized by a repeating noise pattern composed of two intervals, the low noise interval and a high noise interval, the second transceiver transmits two discrete multitone symbols using a first subchannel bit encoding map during each interval of low noise at the first transceiver, and transmits three discrete multitone symbols using a second subchannel bit encoding map during each interval of high noise at the first transceiver, the first subchannel bit encoding map employing higher order constellations for encoding at least some of the subchannels.

* * * * *